March 6, 1962  E. J. KUREK  3,023,689
GRATING FOR DEFINING AND CONTROLLING AN AIR SCREEN
Filed Dec. 12, 1958  7 Sheets-Sheet 1

INVENTOR.
Edwin J. Kurek
BY
Cromwell, Greist + Warden
Attys.

March 6, 1962 E. J. KUREK 3,023,689
GRATING FOR DEFINING AND CONTROLLING AN AIR SCREEN
Filed Dec. 12, 1958 7 Sheets-Sheet 2

INVENTOR.
Edwin J. Kurek
BY
Cromwell, Greist & Warden
Attys.

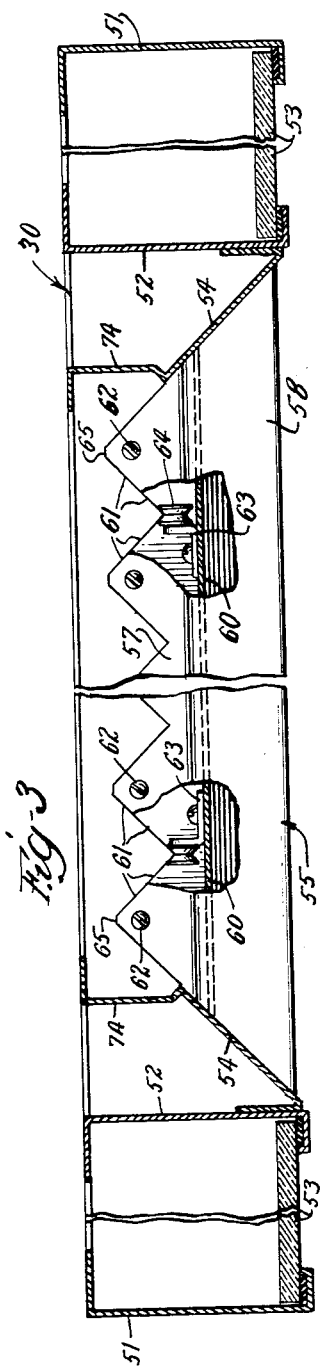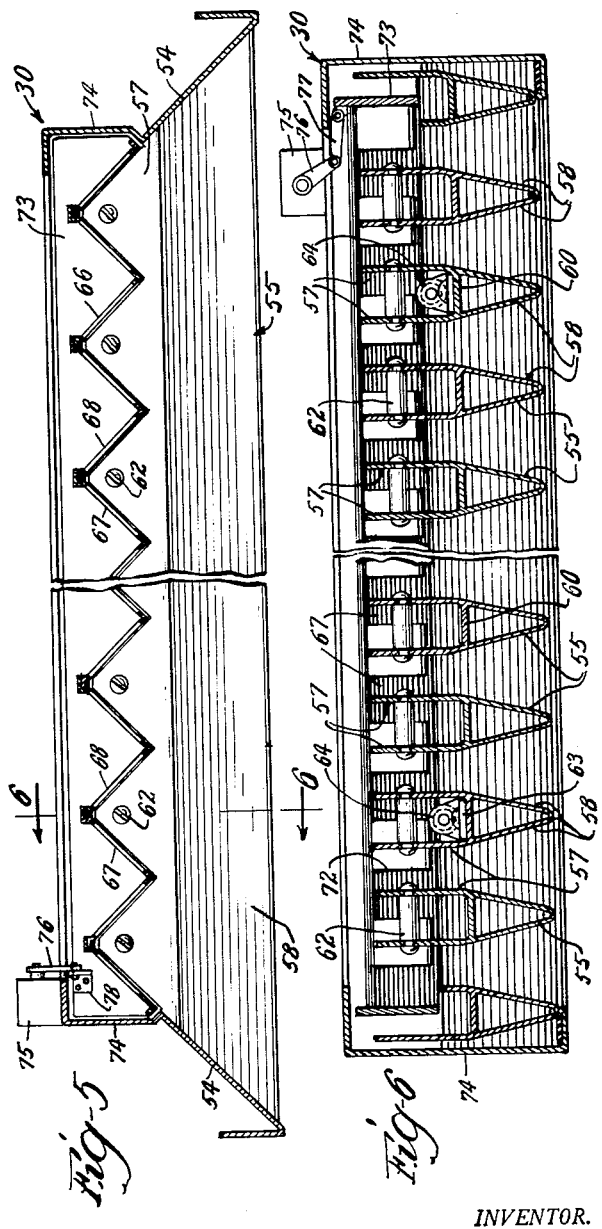

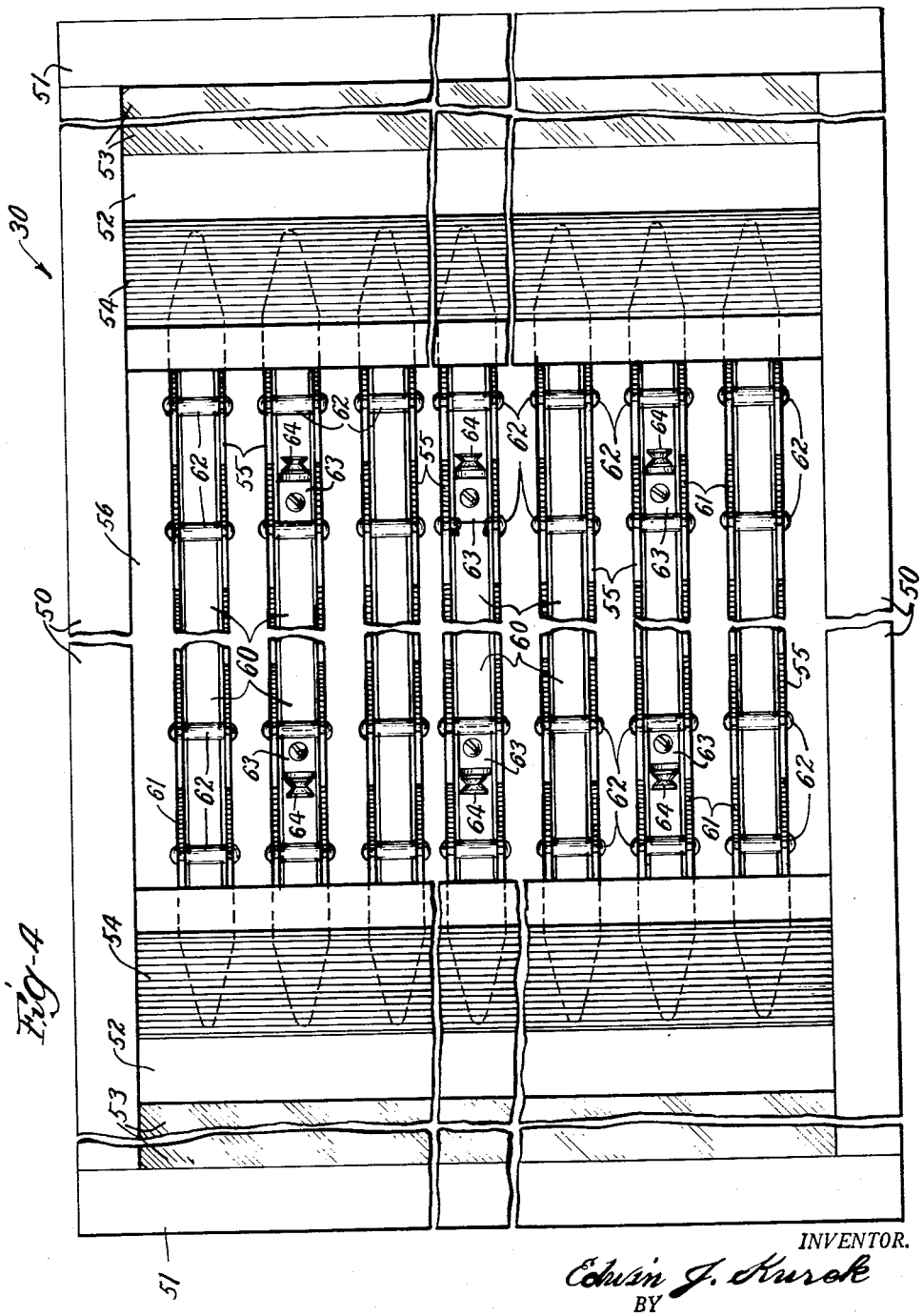

March 6, 1962 E. J. KUREK 3,023,689
GRATING FOR DEFINING AND CONTROLLING AN AIR SCREEN
Filed Dec. 12, 1958 7 Sheets-Sheet 5
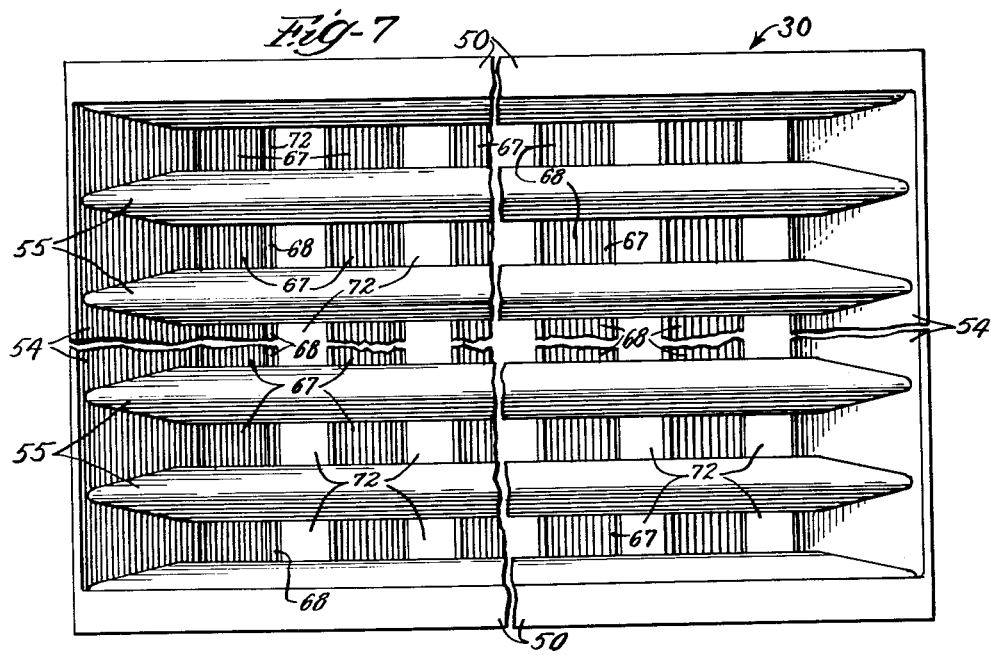
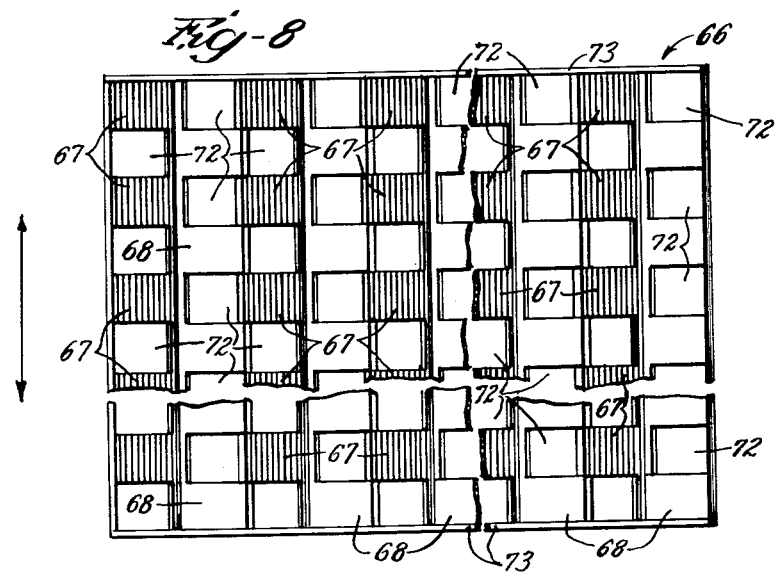
INVENTOR.
Edwin J. Kurek
BY
Cromwell, Greist & Warden
Attys.

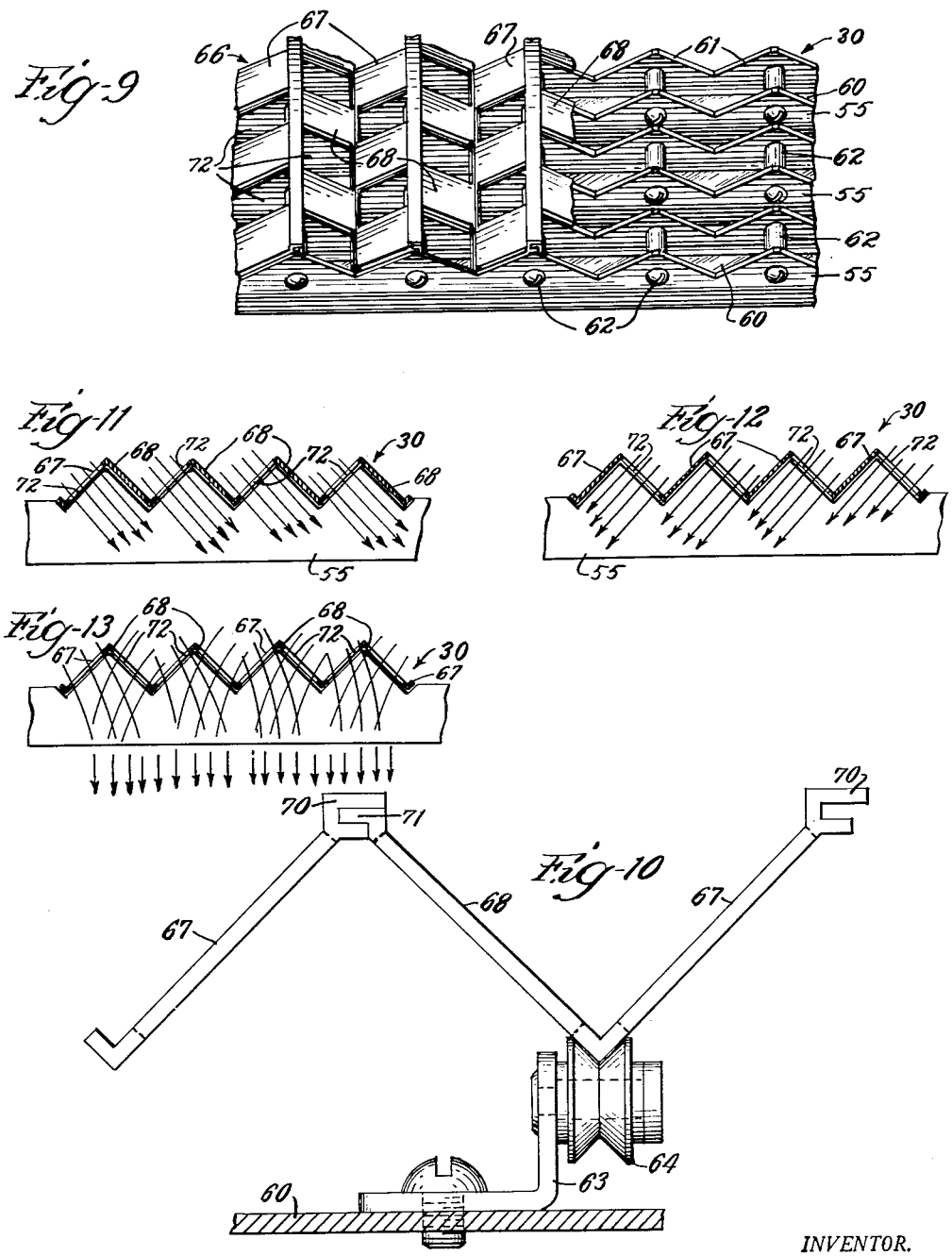

March 6, 1962 E. J. KUREK 3,023,689
GRATING FOR DEFINING AND CONTROLLING AN AIR SCREEN
Filed Dec. 12, 1958 7 Sheets-Sheet 7
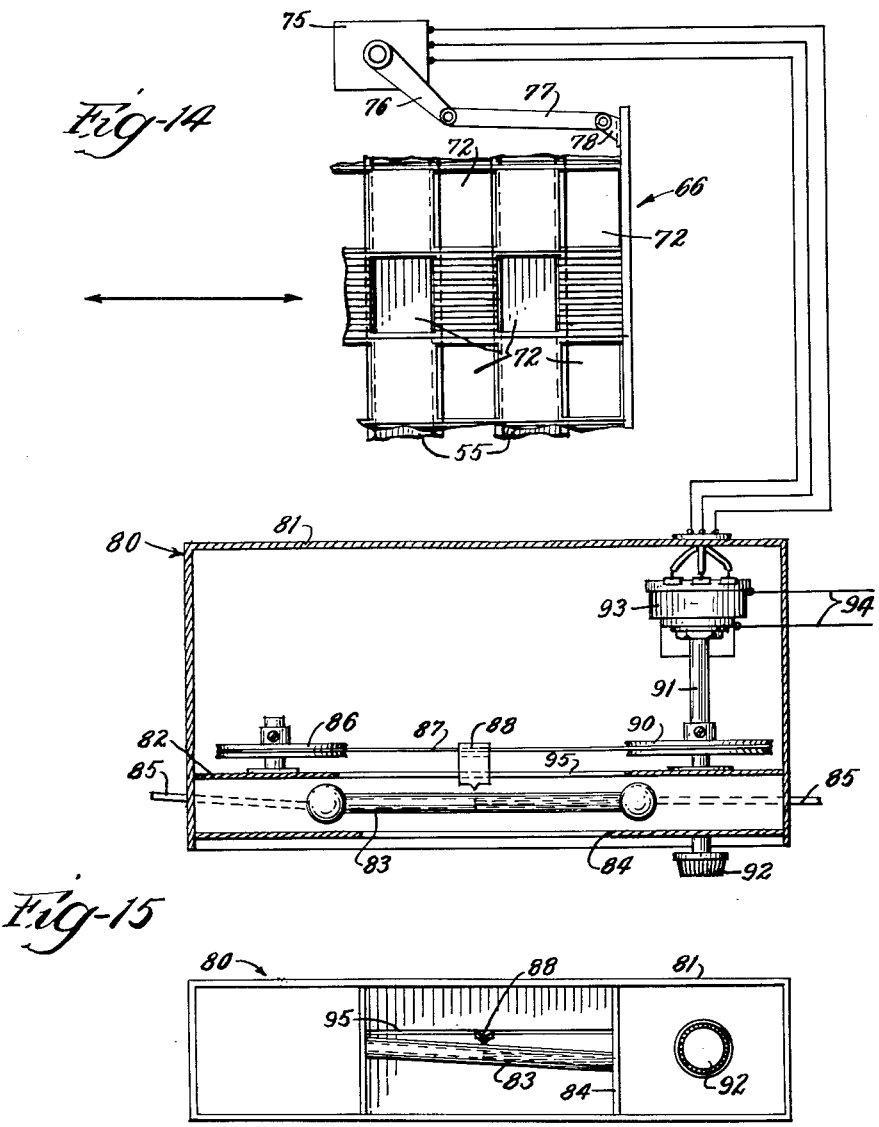

tent Office 3,023,689
Patented Mar. 6, 1962

3,023,689
GRATING FOR DEFINING AND CONTROLLING AN AIR SCREEN
Edwin J. Kurek, New Castle, Ind., assignor to New Castle Products, Inc., New Castle, Ind., a corporation of Indiana
Filed Dec. 12, 1958, Ser. No. 779,919
7 Claims. (Cl. 98—36)

The present invention is directed to a new and improved form of air discharge grating particularly adapted for use in an air screen room closure or portal structure. The invention is further directed to a particular form of control of a type suitable for use with the grating to regulate and adjust the same for variable directional air discharge therefrom in conformance with variations in internal and external pressure conditions surrounding a room closure or door structure and affecting the operational efficiency thereof.

With the ever-expanding use of air screens in substitution for swinging and revolving door structures, it has been found important to make use of an air discharge grating which is capable of ready adjustment to vary the direction of air discharge in overcoming external disturbances tending to disrupt the continuity of the air screen. Air screen structures at the present time are used rather widely in commercial buildings to permit ready ingress and egress without bottlenecking. The air screen established and maintained by the structure must be, in effect, capable of creating an impenetrable screen which will not be ruptured or otherwise adversely affected by the passage of persons therethrough or by changes in external and internal air pressure conditions such as caused by changing weather or the operation of building ventilation and conditioning systems. It has been found that an air screen in order to maintain its effectiveness must not only be of adequate depth but must also be capable of variable directional change to slant the same either inwardly or outwardly of the door opening to a degree adequate to neutralize any disruptive effect internal or external pressure condition might normally have on the air screen.

It is an object of the present invention to provide a new and improved air discharge control grating particularly adapted for use in an air screen structure to define, regulate and control an air screen under variable conditions.

A further object is to provide a new and improved air discharge control grating for use in an air screen structure, which grating is of relatively uncomplicated, inexpensive design while being capable of highly efficient operational use.

Still another object of the present invention is to provide a manually operated control means for use with the grating of the present invention to regulate the same in varying air directional discharge therefrom in response to varying conditions which may adversely affect the efficient use of the air screen.

Other objects not specifically set forth will become apparent from the following detailed description made in conjunction with the drawings wherein:

FIG. 3 is an enlarged fragmentary, longitudinal section of a portion of the grating of the present invention taken generally along line 3—3 in FIG. 1, the transversely movable air discharge directional control means forming an important part of the grating being absent from the showing in FIG. 3 for ease of understanding certain of the structural features of the grating;

FIG. 4 is a fragmentary top plan view of the grating with the air discharge directional control means removed therefrom as in FIG. 3;

FIG. 5 is a fragmentary, longitudinal section of the grating illustrating the central portion thereof and including the air discharge directional control means;

FIG. 6 is a transverse section of the grating taken generally along line 6—6 in FIG. 5;

FIG. 7 is a fragmentary bottom plan view of the grating;

FIG. 8 is a fragmentary bottom plan view of the air discharge control means forming a part of the grating;

FIG. 9 is a fragmentary perspective of a portion of the grating illustrating the operational cooperation between certain parts thereof;

FIG. 10 is an enlarged, fragmentary detail illustrating the mounting of the air discharge directional control means in the grating;

FIGS. 11–13 illustrate in diagram form operational use of the grating;

FIG. 14 illustrates partly in top plan section and diagrammatic showing the control assembly for use with the grating of the present invention; and FIG. 15 is a front elevation of the control assembly housing of FIG. 14.

Figure 1:
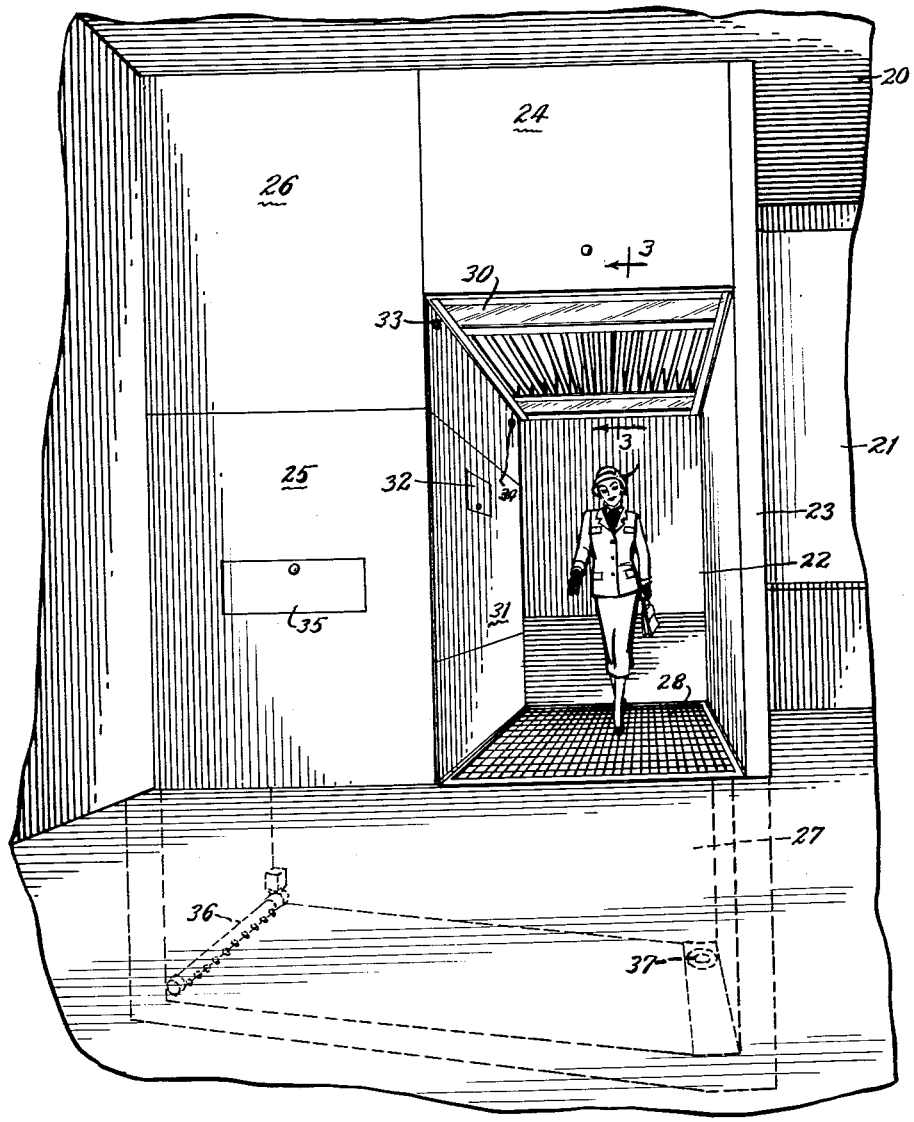
FIG. 1 is a fragmentary perspective of a typical air screen structure installation in which the grating of the present invention is particularly adapted for use.

In FIG. 1 an air door structure is illustrated as installed in an opening in the front of a building 20, such as in a store having a front glass window section 21. The air screen structure includes a corridor-type opening 22 through which persons pass and in which an air screen is operative. The opening 22 is defined by an inwardly directed wall portion 23, an overhead enclosed plenum 24, vertically stacked air moving and conditioning compartments 25 and 26, an air return compartment 27 which is installed below floor level, and a floor grating 28 through which the air defining the air screen is drawn and recirculated for re-use. The bottom surface of the plenum 24 and the ceiling of the door opening 22 is defined by the new and improved air discharge directional control grating 30 of the present invention.

The side wall 31 which is opposite the wall portion 23 is provided with a series of removable panels for access into the air moving and conditioning equipment for maintenance purposes. One of the panels defining this wall also carries a small access panel 32 which is used by the operator of the air screen structure to regulate the air conditioning portion of the structure particularly where heated air is used in defining the air screen. The top portion of the side wall 31 is provided with spaced openings 33 and 34 for the communication of pressure differential sensing means with the interior and exterior of the building 20. The compartment 25 carries an access panel 35 which upon opening exposes a control unit of the type to be described which is used in the operation of the air discharge grating 30.

The air return chamber 27 is in the form of a pit and is provided with a water spray 36 located at the upper end of an inclined bottom wall for periodic flushing of the pit to remove debris, dirt, etc. collected therein through the floor grating 28. The lower end of the bottom of the pit 27 is provided with a suitable drain 37.

Figure 2:
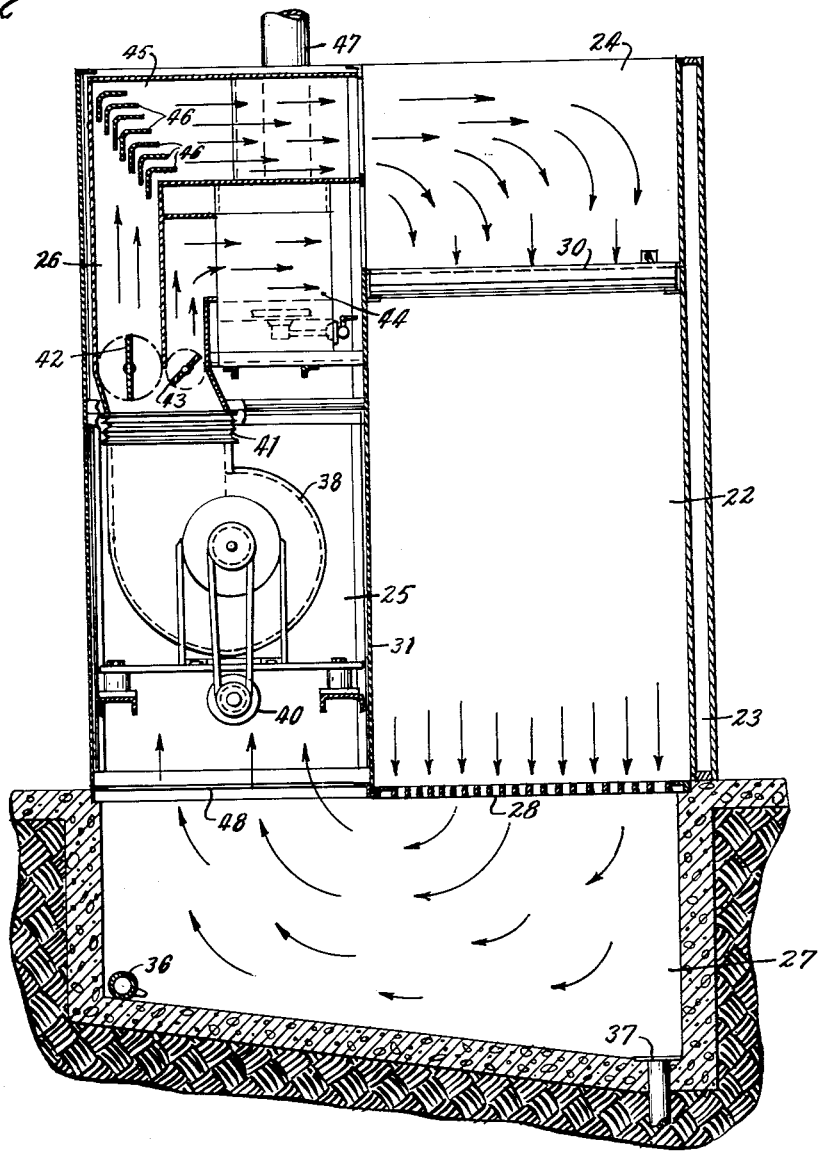
FIG. 2 is a vertical section of the installation of FIG. 1, the components of the air screen structure being illustrated in elevation as viewed in FIG. 1.

FIG. 2 generally illustrates the operation of the air screen structure and the air moving and conditioning components thereof. The bottom compartment 25 includes therein a suitable air moving blower 38 which is driven by an underslung electric motor 40. An expandable joint 41 connects the discharge of the blower 38 with the upper air conditioning compartment 26. Adjustable baffles 42 and 43 subdivide the air moving upwardly toward the plenum 24 to send a portion of the air through a gas heater 44 when heated air is desired in forming the air screen. The remainder of the air delivered from the blower 38 is moved upwardly through a passageway 45 including a series of right-angled baffles 46 to change the direction of the air from vertical upward flow to horizontal flow into the plenum 24. The gas heater 44 is provided with a flue stack 47 which extends upwardly out of the building.

Air passing through the heater 44 and by-passing the same through the passageway 45 is mixed in the plenum 24 and moves downwardly through the grating 30 to define a continuous air screen within the opening 22. The air is recirculated through the floor grating 28 and pit 27 to be picked up by the blower 38 and moved upwardly into the air conditioning compartment 26 in the manner previously described. A suitable filter 48 may be mounted in the opening communicating the pit 27 with the blower compartment 25.

The air screen structure just described is illustrative of the type of structure in which the new and improved air discharge directional control grating of the present invention may be used. This description of a specific air screen structure is not to be construed as limiting to the scope of the present invention as it will be appreciated that the grating of this invention may well be used in other types of air screen or portal structures.

Referring particularly to FIGS. 3 and 4, the grating 30 includes two side frames 50 connected at opposite ends with transverse end frames 51 which are associated with intermediate transverse frames 52. At each end of the grating 30 the combined transverse frames 51 and 52 define therebetween a compartment in which is received a decorative glass or plastic panel 53. Inwardly of each of the panel compartments the grating 30 is provided with a transverse, inclined frame member 54 which suitably supports a plurality of longitudinally extending and transversely spaced air discharge stabilizing fins 55 which are, in effect, vanes or vane-like members which longitudinally subdivide a central air discharge area 56 (FIG. 4) to provide the same with a plurality of spaced slot-like air discharge openings. As shown in FIG. 1, the vanes 55 extend longitudinally of the doorway opening 22 and function in one respect to subdivide and spread air discharged from the plenum 24 across the opening 22 to provide a uniform air screen. The air discharge opening 56 is of adequate length longitudinally of the doorway opening 22 to establish an air screen of substantial depth for efficient operational use.

As particularly shown in FIG. 6, each vane 55 is hollow being provided with upstanding, spaced parallel top wall portions 57 and inwardly convergent bottom wall portions 58 which are joined at their bottom edges to define a tapered nose-like bottom surface on the vanes. Transversely of each vane 55 and interiorly thereof is an integral continuous wall-like web 60 which strengthens each vane. With this arrangement, each vane 55 may be readily formed by extrusion and while this is a preferred form of vane structure, it should be understood that any suitable vane structure capable of use in the manner to be described may be used.

Referring particularly to FIG. 3, opposite ends of each vane 55 are inclined to conform with the inclination of the main portion of the frame members 54 and are suitably attached thereto for supporting thereby. The upper edge of each side wall 57 of each vane 55 is serially grooved to provide a plurality of saw-tooth members or edge portions 61. For bracing of these portions, each spaced pair of each vane 55 has preferably received therethrough a spacing and rigidifying pin assembly 62 which is of any suitable structure.

As particularly illustrated in FIGS. 3 and 4, certain of the vanes 55 have suitably mounted on the transverse wall portions 60 thereof spaced brackets 63 which carry transversely directed rollers 64. FIG. 3 illustrates each of the rollers 64 as being located in association with the lowermost extension of a groove defined by the saw-tooth edge portions 61 for a purpose to be described. The upper extremity of each saw-tooth edge portion 61 is blunted as illustrated in FIG. 3 and designated by the numeral 65.

As particularly shown in FIGS. 5-9, the stationary structure described above has mounted thereon a movable air discharge directional control means 66 which, generally described, is in the form of a corrugated apertured plate with the apertures thereof arranged in checkerboard fashion. More specifically, the movable plate 66 is formed from a plurality of interconnected two-panel members providing juxtaposed divergent plane surfaces or panel portions 67 and 68 which are inclined relative to one another to conform to the saw-tooth configuration of the edge portions 61 of the vanes 55. As particularly shown in FIGS. 5-9, the movable plate 66 is mounted transversely over the tops of the fixed vanes 55 and the inclined panel portions thereof are received in the grooves defined by the saw-tooth edge portions 61.

Each two-panel member including a pair of panel portions 67 and 68 is of one-piece construction as shown in FIG. 10. This preferred form of construction permits formation of a two-panel member by extrusion, although it will be understood that any suitable configuration or combination of panel portions come within the scope of the present invention providing the intended results are accomplished. Each two-panel member is generally V-shaped in cross section with one top edge being provided with a horizontal groove assembly 70 and with the remaining top edge being provided with a horizontal tongue assembly 71. FIG. 10 illustrates the receiving of a tongue 71 in the groove assembly 70 of an adjacent panel portion 67 with the combined elements being suitably fixed in interconnected relation. The lowermost outer edge portion of each two-panel member is designed to be received in circumferentially grooved surface of a roller 64. Any number of such rollers may be utilized in the grating, the purpose of these rollers being to space the movable plate 66 sufficiently out of engagement with the saw-tooth edge portions 61 to permit transverse movement of the plate 66 relative to the fixed vanes 55. The number of rollers 64 used will depend largely on the total weight of the plate 66.

Each of the panel portions 67 and 68 are provided with window-like openings or apertures 72 which are longitudinally spaced along each panel portion with alternate panel portions having their apertures 72 in transverse alignment to provide an overall checkerboard arrangement. The alternately oppositely inclined panel portions 67 and 68 in their interconnected relation are received within a frame structure 73 with their opposite ends and exposed edges suitably attached thereto. In mounting the plate 66 on the fixed vane assembly, the frame 73 carrying the inclined panel portions is received within upwardly directed flanged frame members 74 (see FIG. 3) to be contained therein for transverse sliding movement across the vanes 55. As shown in FIG. 6, the movement of the plate 66 is from left to right and vice versa as viewed with the endmost vanes 55 having their innermost upper wall portion 57 removed to receive the plate 66. Operation of the control unit 66 is brought about directly by the operation of a reversible electric motor 75 mounted on the frame portion 74 as shown in FIGS. 5 and 6. The motor 75 is provided with a linkage 76 fixedly connected to its drive shaft and pivotally connected to a further linkage 77 which at its outermost end is pivotally connected to a bracket 78 which is fixed to a portion of the frame 73 of the plate 66. Operation of the motor 75 will be described in connection with the control assembly illustrated in FIGS. 14 and 15.

Operation of the grating 30 is best illustrated in FIGS. 11-13. With the overall staggering of the apertures 72 in the plate 66, movement of the plate 66 transversely of the fixed vanes 55 varies the registration of a longitudinal series of apertures in alternate panel portions 67 and 68 with the slots between the fixed vanes 55. Additionally, the apertures of the panel portions intermediate those that register with the discharge slots are effectively closed off by registration with the interior of the various vanes 55. Consequently, movement of the plate 66 relative to the fixed vanes 55 to the degree illustrated in FIG. 11 results in registration of the apertures 72 of the alternate panel portions 67 with the slots between the vanes 55 resulting in uni-directional discharge of air from the plenum 24 either toward the exterior of the doorway opening 22 or toward the interior of the building as the case may be. The apertures in the panel portions 68 become registered with the interiors of the vanes 55 and air moving through the same is trapped and returned to the plenum. Movement of the plate 66 to a degree to bring the apertures of the panel portions 68 in alignment with the slots between the vanes 55 results in uni-directional air discharge in the opposite direction as illustrated in FIG. 12. Movement of the plate 66 to an intermediate extent results in partial exposure of all of the apertures for the opposite directional air discharge through each panel portion 67 and 68 to an extent that ultimate air screen flow is at least substantially vertically downwardly as illustrated in FIG. 13.

Thus, with the operation described, movement of the plate 66 will bring about air discharge in three possible directions, namely, vertically, downwardly, and in alternately oppositely inclined directions. Partial alignment of the apertures 72 with the air discharge slots between the vanes 55 for vertically downward air flow is generally illustrated in FIG. 6. Uni-directional slanted air flow is illustrated in FIG. 7, with this air flow occurring toward the left as vewed. FIG. 9 illustrates uni-directional air flow slanted toward the right as viewed with the apertures 72 of the panel portions 67 being aligned with the vanes 55 and the apertures 72 of the panel portions 68 being aligned with the slots between the vanes 55.

The apertures 72 in each panel portion 67 and 68 are dimensioned to be effectively closed off by a vane 55 when aligned with the same and to be at least substantially open for air discharged therethrough when aligned with one of the slots between the vanes. The apertures 72 are preferably of equal dimensions longitudinally of each panel portion and are preferably spaced along each panel portion to an extent which is substantially equal to their dimensions.

FIGS. 14 and 15 illustrate a control unit 80 in operative connection with the plate 66 of the grating 30. The unit 80 includes a housing 81 mounted in the air moving compartment 25 of the door structure immediately behind the access panel 35 illustrated in FIG. 1. The compartment 80 is subdivided near the front face thereof by a transverse wall 82 on which is mounted a slant tube manometer 83. The central tube portion of the manometer 83 is visible through an aperture 84 in the front wall of the housing 81. A suitable colored, flowable material is received in the manometer 83 and is subjected to internal and external pressure conditions transmitted through the openings 33 and 34 in the door structure shown in FIG. 1 through suitable tubing 85 illustrated in FIG. 14. With this arrangement, the flowable material in the manometer 83 will be positioned in the central tube-like portion according to the pressure differential between the interior and exterior of the door structure.

Mounted on the subdividing wall portion 82 is an idler pulley 86 having received thereabout a dial cord 87 which carries fixed thereto a dial or pointer 88. The cord 87 is further supported by a drive pulley 90 which is fixedly mounted on a shaft 91 extending through the front face of the housing 81. The outermost end of the shaft 91 is provided with a knob 92 and the innermost end of the shaft 91 is received in a bridge-type potentiometer 93 which is suitably supported in the housing 81. The potentiometer 93 is electrically connected to the motor 75 previously described through three leads for reversible operation of the motor 75 during periods of potentiometer unbalance for movement of the plate 66 through the linkages connecting the same. The potentiometer 93 is powered from a suitable source through leads 94.

The subdividing wall 82 is provided with a transverse slot 95 aligned with the opening 84 in the front of the housing 81. The pointer 88 is received through the slot 95 in association with the tube portion of the manometer 83. Upon changes in pressure conditions which would tend to affect efficient utilization of the air screen, the flowable material in the manometer 83 will move in the tube portion thereof in response to such pressure changes. The operator of the air screen structure will rotate the knob 92 to an extent to align the pointer 88 with the new position of the flowable material in the manometer and in doing so will automatically adjust the potentiometer 93 with a resultant energization of the motor 75. The plate 66 is thus moved to a new position to adjust the discharge of air through the grating 30 for equalization of pressure variation.

The use of a slant tube manometer 83 permits air discharge adjustment for relatively small pressure changes thus providing for the maintenance of high efficiency in air portal operation. The control 80 is of a type that permits ready mounting of the same in any convenient location even remote from the door structure. By way of example, the housing 81 may be mounted on a store manager's desk for remote control of the air door.

Obviously certain modifications and variations of the invention as hereinbefore set forth may be made without departing from the spirit and scope thereof, and therefore only such limitations should be imposed as are indicated in the appended claims.

I claim:

1. An air discharge grating for use in an air screen structure, said grating comprising a plurality of fixed vane-like members which parallel one another and are transversely spaced from one another to define slot-like air discharge openings therebetween, an air discharge directional control means, and means mounting said control means transversely across said vane-like members for transverse reciprocal movement relative thereto, said directional control means being formed from a series of interconnected and alternately oppositely inclined panels, each panel being provided with longitudinally aligned, spaced air discharge apertures which are alternately staggered in adjacent panels, each of said vane-like members and said slot-like air discharge openings being of a width which is at least substantially equal to the width of said air discharge apertures, each of said air discharge apertures being effectively closed off by one of said vane-like members when aligned with the same and at least substantially open for air discharge therethrough when aligned with one of said slot-like openings between said vane-like members, said panels and the air discharge apertures thereof upon movement relative to said vane-like members providing for vertical and alternately oppositely inclined air discharge between said vane-like members.

2. The grating of claim 1 wherein said air discharge directional control means is formed from a plurality of interconnected two-panel members each of V-shape in cross section, a longitudinally continuous tongue and groove arrangement being provided along adjacent edges of adjacent two-panel members with said tongue and groove arrangement being interconnected.

3. An air discharge grating for use in an air screen structure, said grating comprising a plurality of fixed vane-like members which parallel one another and are transversely spaced from one another to define slot-like air discharge openings therebetween, an air discharge directional control means, and means mounting said control means transversely across said vane-like members for transverse reciprocal movement relative thereto, said directional control means including juxtaposed and interconnected divergent plane surfaces provided with alternately staggered, longitudinally spaced air discharge apertures, each of said vane-like members and said slot-like air discharge openings being of a width which is at least substantially equal to the width of said air discharge apertures, each of said air discharge apertures being effectively closed off by one of said vane-like members when aligned with the same and at least substantially open for air discharge therethrough when aligned with one of said slot-like openings between said vane-like members, said plane surfaces and the air discharge apertures thereof upon movement relative to said vane-like members providing for vertical and alternately oppositely inclined air discharge between said vane-like members.

4. An air discharge grating for use in an air screen structure, said grating comprising a plurality of fixed vane-like members which parallel one another and are transversely spaced from one another to define slot-like air discharge openings therebetween, air discharge directional control means extending transversely across said vane-like members and being mounted for transverse reciprocal movement relative thereto, said directional control means comprising a series of apertured panel members each of which are displaced from the horizontal to provide an overall corrugated configuration, the apertures in each panel being transversely alternately staggered in checkerboard arrangement, each of said apertures being dimensioned to be effectively closed off by one of said vane-like members when aligned with the same and to be at least substantially open for air discharge therethrough when aligned with one of said slot-like openings between said vane-like members, said panel members and the apertures thereof upon movement relative to said vane-like members providing for vertically and alternately oppositely inclined air discharge between said vane-like members, each of said vane-like members being serially grooved along the surfaces thereof in operative association with said directional control means, said grooves receiving said panel members therein, and panel member mounting means carried by at least some of said vane-like members.

5. The grating of claim 4 wherein said air discharge directional control means is formed from a plurality of interconnected two-panel members each of V-shape in cross section, a longitudinally continuous tongue and groove arrangement being provided along adjacent edges of adjacent two-panel members with said tongue and groove arrangement being interconnected.

6. An air discharge grating for use in an air screen structure, said grating comprising a plurality of fixed vane-like members which parallel one another and are transversely spaced from one another to define slot-like air discharge openings therebetween, an air discharge directional control means extending transversely across said vane-like members, said directional control means including juxtaposed and interconnected divergent plane surfaces provided with alternately staggered, longitudinally spaced air discharge apertures each of which are dimensioned to be effectively closed off by one of said vane-like members when aligned with the same and to be at least substantially open for air discharge therethrough when aligned with one of said slot-like openings between said vane-like members, said plane surfaces and the air discharge apertures thereof upon movement relative to said vane-like members providing for vertical and alternately oppositely inclined air discharge between said vane-like members, each of said vane-like members being hollow and having upper saw-tooth spaced edges receiving said plane surfaces, and roller means carried in at least some of said vane-like members in supporting engagement with said plane surfaces, the lower portion of each vane-like member being tapered to provide air discharge stabilization.

7. A control device for the operation of an adjustable air discharge grating in an air screen structure, said control device comprising pressure differential responsive means including movable indication means responsive to variation in pressure differential, pointer means connected to a variable voltage control means, reversibly operable drive means for connection to a movable part of an adjustable air discharge grating to operate the same, a power source connected to said voltage control means, an electric circuit interconnecting said drive means with said voltage control means for operation of said drive means in response to voltage variation of said voltage control means, and means for operating said pointer means to vary the position thereof to conform to and align the same with variable positioning of said indication means, the variable positioning of said pointer means providing for voltage variation in said voltage control means.

References Cited in the file of this patent

UNITED STATES PATENTS

| | | |
|---|---|---|
| 1,983,015 | Bailey | Dec. 4, 1934 |
| 2,017,680 | Bailey | Oct. 15, 1935 |
| 2,235,731 | Spalding | Mar. 18, 1941 |
| 2,863,373 | Steiner | Dec. 9, 1958 |